United States Patent Office 3,810,914
Patented May 14, 1974

---

3,810,914
BENZENESULFONYL SEMICARBAZIDES
Laszlo Beregi, Boulogne-sur-Seine, Pierre Hugon, Rueil-Malmaison, Pierre Desnoyers, Fontenay-aux-Roses, and Jacques Duhault, Chatou, France, assignors to Societe en nom Collectif Science Union et Cie, Societe Francaise de Recherche Medical, Suresnes, France
No Drawing. Filed Jan. 27, 1972, Ser. No. 221,377
Claims priority, application Great Britain, Feb. 15, 1971, 4,638/71
Int. Cl. C07d 27/48
U.S. Cl. 260—326.1        7 Claims

ABSTRACT OF THE DISCLOSURE

Benzenesulfonyl semicarbazides of the formula:

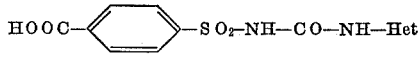

wherein Het is a bicyclic nitrogen containing heterocyclic radical bonded to NH by its nitrogen atom.

These compounds possess microcirculation-improving, fibrinolytic and platelet adhesiveness and aggregation decreasing properties.

---

The present invention provides a benzenesulfonyl semicarbazide of the general formula I:

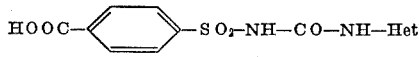   I wherein Het represents a bicyclic nitrogen-containing heterocyclic radical bonded to the NH group by its nitrogen atom and is selected from the group consisting of:

indolinyl, isoindolinyl, hexahydroindolinyl, 4,7-endoalkylene-tetrahydroisoindolinyl, 4,7 - endoalkylene - hexahydroisoindolinyl, 4,7 - endoxo - hexahydroisoindolinyl, tetra- and deca-hydroquinolyl, tetra- and deca-hydroisoquinolyl, aza-bicyclo [3,1,0] hexyl, aza-bicyclo [3,2,0] heptyl, aza-bicyclo [3,3,0] octyl, azabicyclo [2,2,2] octyl, aza-bicyclo [3,2,1] octyl, aza-bicyclo [4,3,0] nonyl, aza-bicyclo [3,2,2] nonyl, aza-bicyclo [3,3,1] nonyl and aza-bicyclo [4,3,0] nonenyl radicals.

The present invention also provides an addition salt of a compound of the formula I with a suitable base. Among the bases that may be used, there may be mentioned, for example, alkaline metal hydroxides, amines, for example propylamine, butylamine, diethylamine and dipropylamine and amino-alcohols for example 1-amino-2-propanol, 2-amino-2-methyl-1-propanol and choline.

The compounds of the general formula I are new and may be prepared according to a process which comprises reacting a compound of formula:

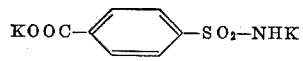

with a 4,4-diphenyl semicarbazide of the general formula II

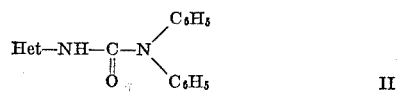   II wherein Het has the meaning given above.

The 4,4-diphenyl semicarbazides of the formula II may be obtained, for example, by the method described by J. M. McManus and C. F. Gerber in J. of Med. Chem. 9, 256 (1966) which comprises reacting an N-amino bicyclic heterocycle (Het—NH$_2$) with diphenyl carbamoyl chloride.

The N-amino bicyclic heterocycle may be prepared according to the process described by J. B. Wright and R. E. Willette in J. Med. and Pharm. Chem., 5, 819 (1962) which comprises nitrosating the bicyclic heterocycle and reducing the resulting N-nitroso derivative with lithium aluminium hydride.

The following Examples illustrate the present invention, all parts being by weight and melting points being determined on a Kofler block (K), or on a Kofler heater under a microscope (M.K.).

EXAMPLE 1

1-para-carboxybenzenesulfonyl-3-[3-azabicyclo (3,3,0) oct-3-yl] urea 32.1 parts of 1,1-diphenyl-3-[3-azabicyclo (3,3,0) oct-3-yl] urea were added to 27.7 parts of dipotassium salt of para-carboxybenzenesulfonamide suspended in a mixture of 300 ml. of dimethylformamide and 50 ml. of water. The reaction mixture was heated on a steam-bath for 90 minutes and then concentrated in vacuo. The resulting crude product was treated with 250 ml. of water and 250 ml. of ether. The aqueous layer was acidified to pH 3.5 with a normal aqueous solution of HCl. The precipitate formed was filtered and air-dried. Recrystallization from 92 ml. of D.M.F. and 36 ml. of water gave 17.5 parts of 1-para-carboxybenzenesulfonyl - 3 - [3-azabicyclo (3,3,0) oct-3-yl] urea, M.P. (K): 232–235° C., (M.K.): 186–191° C.

EXAMPLES 2–7

The following compounds were obtained by a process analogous to that described in Example 1.

2. 1-para-carboxybenzenesulfonyl - 3 - [3 - azabicyclo (3,2,2) non-3-yl] urea, M.P. (K): 240° C., (M.K.): 181–182° C. (D.M.F./H$_2$O), starting from 1,1-diphenyl-3-[3-azabicyclo (3,2,2) non-3-yl] urea and di-potassium salt of para-carboxybenzenesulfonamide.

3. 1-para-carboxybenzenesulfonyl - 3 - [8 - azabicyclo (4,3,0) non-3-en-8-yl] urea, M.P. (K): 242–246° C., (M.K.): 192–195° C. (D.M.F./H$_2$O), starting from 1,1-diphenyl-3-[8-azabicyclo (4,3,0) non-3-en-8-yl] urea and dipotassium salt of para-carboxybenzenesulfonamide.

4. 1-para-carboxybenzenesulfonyl - 3 - [8 - azabicyclo (4,3,0) non-8-yl] urea, M.P. (K): 250° C., (M.K.): 190–192° C. (D.M.F./H$_2$O), starting from 1,1-diphenyl-3-[8-azabicyclo (4,3,0) non-8-yl] urea and dipotassium salt of para-carboxybenzenesulfonamide.

5. 1-para-carboxybenzenesulfonyl - 3 - [3 - azabicyclo (3,2,0) hept-3-yl] urea, M.P. (K): 252–253° C., (M.K.): 194–199° C., (D.M.F./H$_2$O), starting from 1,1-diphenyl-3-[3-azabicyclo (3,2,0) hept-3-yl] urea and di-potassium salt of para-carboxybenzenesulfonamide.

6. 1-para-carboxybenzenesulfonyl - 3 - (2-isoindolinyl) urea, M.P. (M.K.): 230–233° C., (D.M.F./H$_2$O), starting from 1,1-diphenyl-3-(2-isoindolinyl) urea and di-potassium salt of para-carboxybenzenesulfonamide.

7. 1-para-carboxybenzenesulfonyl-3-(1,2,3,4-tetrahydroisoquinol - 2 - yl) urea, M.P. (M.K.): 228–230° C., (D.M.F/H$_2$O), starting from 1,1-diphenyl-3-(1,2,3,4-tetrahydroisoquinol-2-yl) urea and di-potassium salt of para-carboxybenzenesulfonamide.

In a similar manner, di-potassium salt of para-carboxybenzenesulfonamide was successively reacted with 1,1-diphenyl-3-(1-indolinyl) urea,
1,1-diphenyl-3-(1-hexahydroindolinyl) urea,
1,1-diphenyl-3-(4,7-endomethylene-tetrahydroisoindolin-2-yl) urea,
1,1-diphenyl-3-(4,7-endomethylene-hexahydroisoindolin-2-yl) urea,
1,1-diphenyl-3-(4,7-endoxo-hexahydroisoindolin-2-yl) urea,
1,1-diphenyl-3-(1,2,3,4-tetrahydroquinol-1-yl) urea,
1,1-diphenyl-3-[2-azabicyclo (3,1,0) hex-2-yl] urea, 1,1-diphenyl-3-[1-azabicyclo (2,2,2) oct-1-yl] urea,
1,1-diphenyl-3-[2-azabicyclo (3,2,1) oct-2-yl] urea and
1,1-diphenyl-3-[2-azabicyclo (3,3,1) non-2-yl] urea, to give respectively:

1-para-carboxybenzenesulfonyl-3-(1-indolinyl) urea,
1-para-carboxybenzenesulfonyl-3-(1-hexahydroindolinyl) urea,
1-para-carboxybenzenesulfonyl-3-(4,7-endomethylene-tetrahydroisoindolin-2-yl) urea,
1-para-carboxybenzenesulfonyl-3-(4,7-endomethylene-hexahydroisoindolin-2-yl) urea,
1-para-carboxybenzenesulfonyl-3-(4,7-endoxo-hexahydro-isoindolin-2-yl) urea,
1-para-carboxybenzenesulfonyl-3-(1,2,3,4-tetrahydro-quinol-1-yl) urea,
1-para-carboxybenzenesulfonyl-3-[2-azabicyclo (3,1,0) hex-2-yl] urea,
1-para-carboxybenzenesulfonyl-3-[1-azabicyclo (3,2,1) oct-2-yl] urea, and
1-para-carboxybenzenesulfonyl-3-[2-azabicyclo (3,3,1) non-2-yl] urea.

The compounds of the present invention possess valuable pharmacological and therapeutic properties, especially microcirculation-improving, fibrinolytic and platelet adhesiveness and aggregation decreasing properties.

Their toxicity is very weak and the $LD_{50}$ studied in mice by oral route is as low as 1 to >3 g./kg.

The activity on the microcirculation was evidenced by the method of French (Brit. J. Exp. Path. 45, 467, 1964) on the mesocoecum of the rat. It was observed that the new compounds delay the appearance and the evolution of the mural thrombus and decrease the formation of the platelet-thrombus on the wounded wall. The active dose in this test varies from 10 to 50 mg./kg.

The fibrinolytic activity was studied by the method described by von Kaulla in Am. J. Clin. Path. 29, 104 (1958). By administering perorally to the rat 10 to 100 mg./kg. of the new compounds, a decrease of 16 to 50% of the euglobulin lysis time may be observed 30 to 90 minutes after the administration.

An inhibition of the platelet stickiness was shown testing the new compounds by the method of E. W. Salzman (J. Lab. Clin. Med. 62, 724 (1923) on the rat and the rabbit. Doses of 10 to 50 mg./kg. administered perorally decrease the platelet adhesiveness by 30 to 72%.

The effect of the new compounds on the platelet aggregation was evidenced by the photometric technic of Born and O'Brien, modified by Sinakos and Caen (Rev. Fr. E. Clin. Biol, 11, 538–41, 1966). Concentration of 100 to 1000γ/ml. of the new compounds inhibits by 27 to 71% the platelet aggregation provoked by adenosine diphosphate in the rabbit's plasma.

It is to be noted that all the new compounds were tested for hypoglycemic activity and surprisingly were found devoid of any action on the blood sugar level.

The low toxicity and the here-above described pharmacological properties allow the use of the new compounds in therapy, especially in the prevention and treatment of thromboembolic diseases and arteriosclerosis.

The present invention also provides pharmaceutical compositions containing a compound of general formula I or one of its physiologically tolerable salts, in admixture or conjunction with a suitable pharmaceutical carrier, such for example, as distilled water, glucose, lactose, talc, starch, magnesium stearate and cocoa butter. These pharmaceutcial compositions may be in form of tablets, dragées, capsules, suppositories or solutions, in order to be administered by oral, rectal or parenteral route at doses of 50 to 500 mg., 1 to 5 times a day.

We claim:
1. A compound selected from the group consisting of:
(A) benzenesulfonyl semicarbazides of the formula

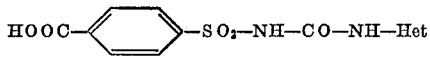

wherein Het is a bicyclic nitrogen containing heterocyclic radical bonded to NH by its nitrogen atom and selected from the group consisting of: indolinyl, isoindolinyl, hexahydroindolinyl, 4,7-endoalkylene-tetrahydroisoindolinyl, 4,7 - endoalkylene-hexahydroisoindolinyl, 4,7-endoxo-hexahydroisoindolinyl, aza-bicyclo [3,1,0] hexyl, aza-bicyclo [3,2,0] heptyl, aza-bicyclo [3,3,0] octyl, 8-aza-bicyclo [4,3,0] non-8-yl and 8-aza-bicyclo [4,3,0] non-3-en-8-yl; and
(B) physiologically tolerable basic addition salts thereof.

2. A compound selected from the group consisting of benzenesulfonyl semi-carbazides having the formula:

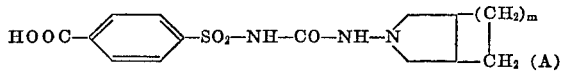

and

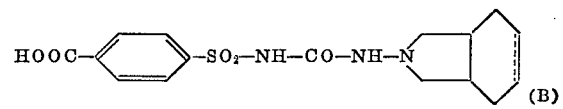

wherein m is zero, 1 or 2 and wherein the dotted line indicates an optionally present double bond.

3. A compound of claim 2 which is 1-para-carboxybenzenesulfonyl-3-[8-azabicyclo (4,3,0) non-8-yl] urea.

4. A compound of claim 2 which is 1-para-carboxybenzenesulfonyl-3-[3-azabicyclo (3,2,0) hept-3-yl] urea.

5. A compound of claim 1 which is 1-para-carboxybenzenesulfonyl-3-[3-aza-bicyclo (3,3,0) oct-3-yl] urea.

6. A compound of claim 1 which is 1-para-carboxybenzenesulfonyl-3-[8-azabicyclo (4,3,0) non - 3 - en-8-yl] urea.

7. A compound of claim 1 which is 1-para-carboxybenzenesulfonyl-3-(2-isoindolinyl) urea.

References Cited
UNITED STATES PATENTS
3,583,983   6/1971   Schenker et al. ____ 260—239.6

JOSEPH A. NARCAVAGE, Primary Examiner

U.S. Cl. X.R.

260—239 BF, 293.54, 326.11 R, 326.3; 424—267, 274